United States Patent [19]

Malm

[11] 4,023,103

[45] May 10, 1977

[54] SYNCHRONIZER FOR FREQUENCY HOPPING RECEIVER

[75] Inventor: Robert E. Malm, Los Angeles, Calif.

[73] Assignee: The United States of America as represented by the Secretary of the Army, Washington, D.C.

[22] Filed: Jan. 26, 1976

[21] Appl. No.: 652,586

[52] U.S. Cl. ................................ 325/58; 178/69.1; 325/63; 328/14; 325/65

[51] Int. Cl.² ........................................... H04B 7/20

[58] Field of Search ................ 328/14, 25, 124, 15; 325/63, 56, 65, 418, 58, 322, 323, 324, 325; 178/69.5 R

[56] References Cited

UNITED STATES PATENTS

| | | | |
|---|---|---|---|
| 3,409,889 | 11/1968 | Graham | 325/58 |
| 3,713,025 | 1/1973 | McNair | 325/58 |
| 3,766,477 | 10/1973 | Cook | 325/63 |
| 3,851,251 | 11/1974 | Wigner et al. | 325/58 |
| 3,962,634 | 6/1976 | Russo | 325/58 |

*Primary Examiner*—Robert L. Griffin
*Assistant Examiner*—Tommy P. Chin
*Attorney, Agent, or Firm*—Nathan Edelberg; Edward Goldberg; Sheldon Kanars

[57] ABSTRACT

A receiver of a fast frequency hopping (FFH) system is synchronized with a sending transmitter in three phases from a starting condition where the frequency hopping local signal leads the received signal prior to synchronization. During the first phase, the difference frequency of a frequency hopping received signal and the frequency hopping local signal is monitored for IF during each FFH period. The FFH periods are grouped; when there is IF during all the periods of a group, the first phase terminates; however, until this condition is met, the local frequency is set back one FFH period for each group of periods. Then in the next phase, the IF in the two halves of each FFH period is compared to ascertain whether more of the leading half or more of the trailing half of each FFH period has the IF and the phase of the local signal is adjusted until the phase difference between the frequency hopping local signal and the frequency hopping received signal is less than a predetermined minor fraction of an FFH period. Then in the following phase, two additional local signals, the same as, the one local signal but phase advanced and phase retarded, respectively, by the same minor fraction of an FFH period, are separately mixed with the received signal and the differences compared; the phase of the local signal is finely adjusted to substantially equalize the IF obtained from the two signals. A fourth phase similar to the preceding phase can be added for still finer adjustment.

10 Claims, 4 Drawing Figures

FIG. 1A
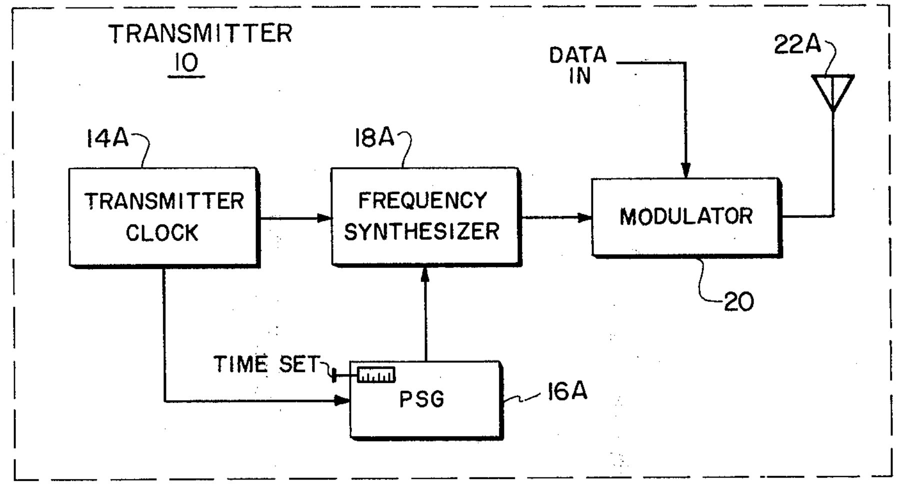
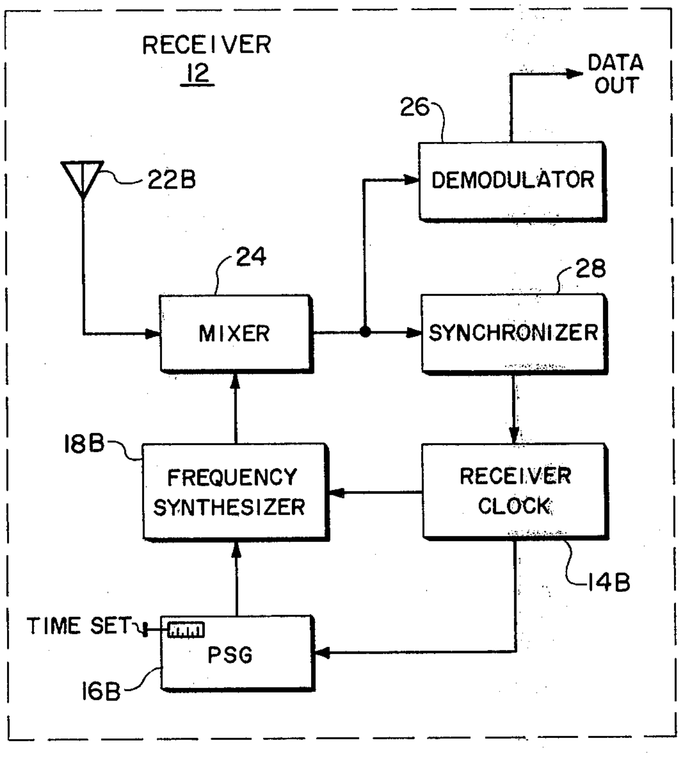
FIG. 1B

SYNCHRONIZER FOR FREQUENCY HOPPING RECEIVER

BACKGROUND OF THE INVENTION

Frequency hopping communication is also referred to as spread spectrum communication. In this method of communication the carrier frequency of a transmitter and the local frequency of a receiver of the same system hop in unison among respective preselected populations of frequencies. In each case, the frequencies are equally spaced between the limits of a selected band. The frequency hopping period is constant. At both transmitter and receiver, the hopping is controlled to follow a predetermined random program. The program repeats after a period measured in hours, days or months. Synchronizing methods known heretofore are inadequate.

It is an object of this invention to provide a method and means for synchronizing a receiver of a frequency hopping system with a transmitter of the system very rapidly at the beginning of a transmitted message without disturbing the transmitter.

SUMMARY OF THE INVENTION

This invention concerns synchronizing a fast frequency hopping (FFH) system. The frequency hop rate in FFH is on the order of tens of thousands per second. At the transmitter and receiver, the frequency hopping program is referenced to real time so that if set to Greenwich Mean Time and the same calendar day, for example, transmitter and receiver are nearly in step. This invention operates when the local signal at the receiver leads the received signal. One reason for this lead is transmission time from transmitter to distant receiver, both having been set to the same real time. Synchronization of the receiver is in three phases. First, the receiver checks a predetermined number of frequency hopping periods at a time and if there is no sync, stops the receiver clock for one period only and repeats the process until there is sync to the nearest period. Then the receiver compares the half periods of every frequency hopping period for a predetermined number of periods and advances or retards the receiver clock a predetermined small fraction of a period and repeats the process until there is sync to within a predetermined minor fraction of a period. Then there follows one or more phases in which the receiver clock is finely adjusted in smaller fractions of an FFH period by comparing the IF obtained from phase advanced and phase retarded versions of the frequency hopping local signal.

DESCRIPTION OF A PREFERRED EMBODIMENT

FIGS. 1A and 1B are block diagrams of transmitter and receiver of a frequency hopping system wherein the receiver includes a receiver sychronizer;

Figure 2:
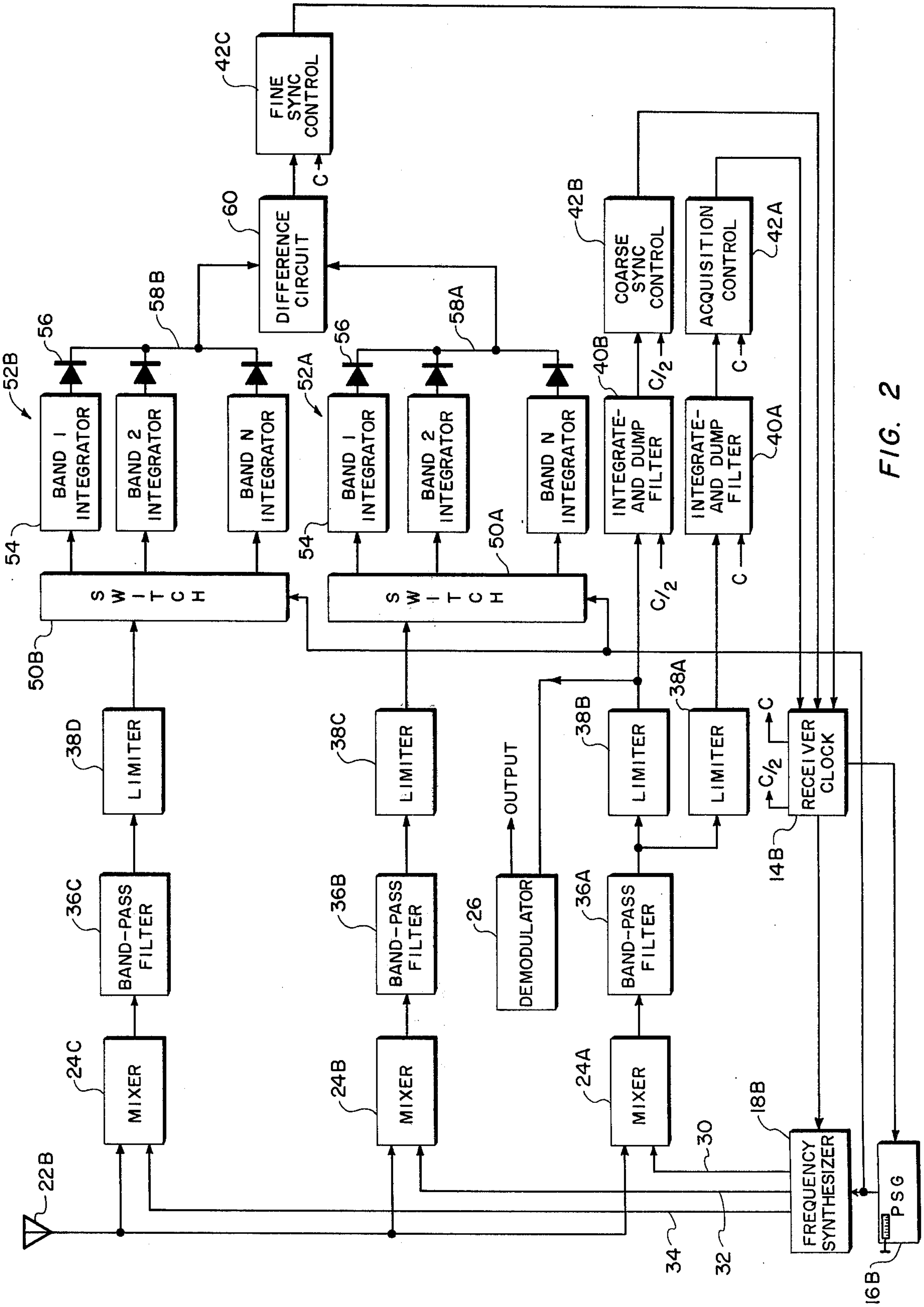
FIG. 2 is a block diagram of the receiver of FIG. 1B including major functional components of the receiver.

In FIG. 1, there is shown an FFH communication system in simplified form including one transmitter 10 and one receiver 12. Transmitter and receiver include corresponding electronic clocks 14A and 14B that provide clock pulses at the frequency hopping rate, pseudo-random sequence generators (PSG) 16A and 16B, and frequency synthesizers 18A and 18B, selected from designs known in the spread spectrum art. The frequency synthesizers 18A and 18B generate carrier and local frequencies, respectively, and each is controlled to generate any one of a population of $2^n$ frequencies that are equally spaced, within the carrier band and local frequency band, respectively. The two PSG circuits can provide $2^n$ distinct n-bit words. Each PSG 16A, 16B is programmed to provide the same predetermined sequence of the *n*-bit words. Each of the *n*-bit words of each PSG addresses a different one of the $2^n$ equally spaced frequencies of the respective frequency synthesizer whereby in each frequeny hopping period, the same IF obtains from the mixing of the received carrier and the synchronized local frequency.

Real time registering clocks, not shown, are included in PSG 16A, 16B and are driven by electronic clocks 14A, 14B and can be set by operators to any selected reference time such as Greenwich Mean Time. Each real time registering clock is functionally linked to the respective PSG so that time registration corresponds to location along the PSG digital word sequence. Each electronic clock 14A, 14B generates pulses at the FFH rate; there are on the order of tens of thousands of periods per second in FFH. Each electronic clock pulse advances the digital word sequence of its PSG by one digital word and advances the time registering clock. Each electronic clock is coupled to the respective frequeny synthesizer to precisely establish the ends of each frequency hopping period. An example of a frequency synthesizer suitable for this invention is disclosed in U.S. Pat. No. 3,671,871 granted to the same inventor. The relationship among clock, PSG, and frequency synthesizer are known to those skilled in the art and their details are not part of this invention.

The FFH carrier output of frequency synthesizer 18A is fed to modulator 20 which is coupled to a digital data source or other intelligence source. The modulated FFH signal is radiated by transmitter antenna 22A and is intercepted by receiver antenna 22B and is coupled to mixer 24. Presuming the local FFH signal from frequency synthesizer 18B is synchronized with the FFH carrier as received at the mixer, demodulator 26 which obtains the difference output of mixer 24, provides at its output the digital data, or other intelligence sent by the transmitter. To synchronize the frequency synthesizer 18B and to keep it in sync, a multiphase synchronizer 28 according to this invention is connected between the output of mixer 24 and the receiver clock 14B.

The receiver circuit shown in FIG. 2 includes the functional parts of the synchronizer 28. The frequency synthesizer 18B is shown connected to clock 14B and PSG 16B as in FIG. 1. However, frequeny synthesizer 18B has three output leads 30, 32, 34 on which it provides three frequency hopping local frequency signals of identical frequency but separated in phase a small fraction of an FFH period. Referred to the signal on output lead 30, the signal on output lead 32 is retarded in phase and the signal on output lead 34 is advanced in phase by an equal amount. Where FIG. 1 shows one mixer 24 connected to the output of the frequency synthesizer 18B and to the antenna 22B, there are three mixers 24A, 24B, 24C connected to the three leads 30, 32, 34, respectively, and to the antenna 22B. The demodulator 26 connected in circuit with mixer 24A provides the output.

Figure 3:
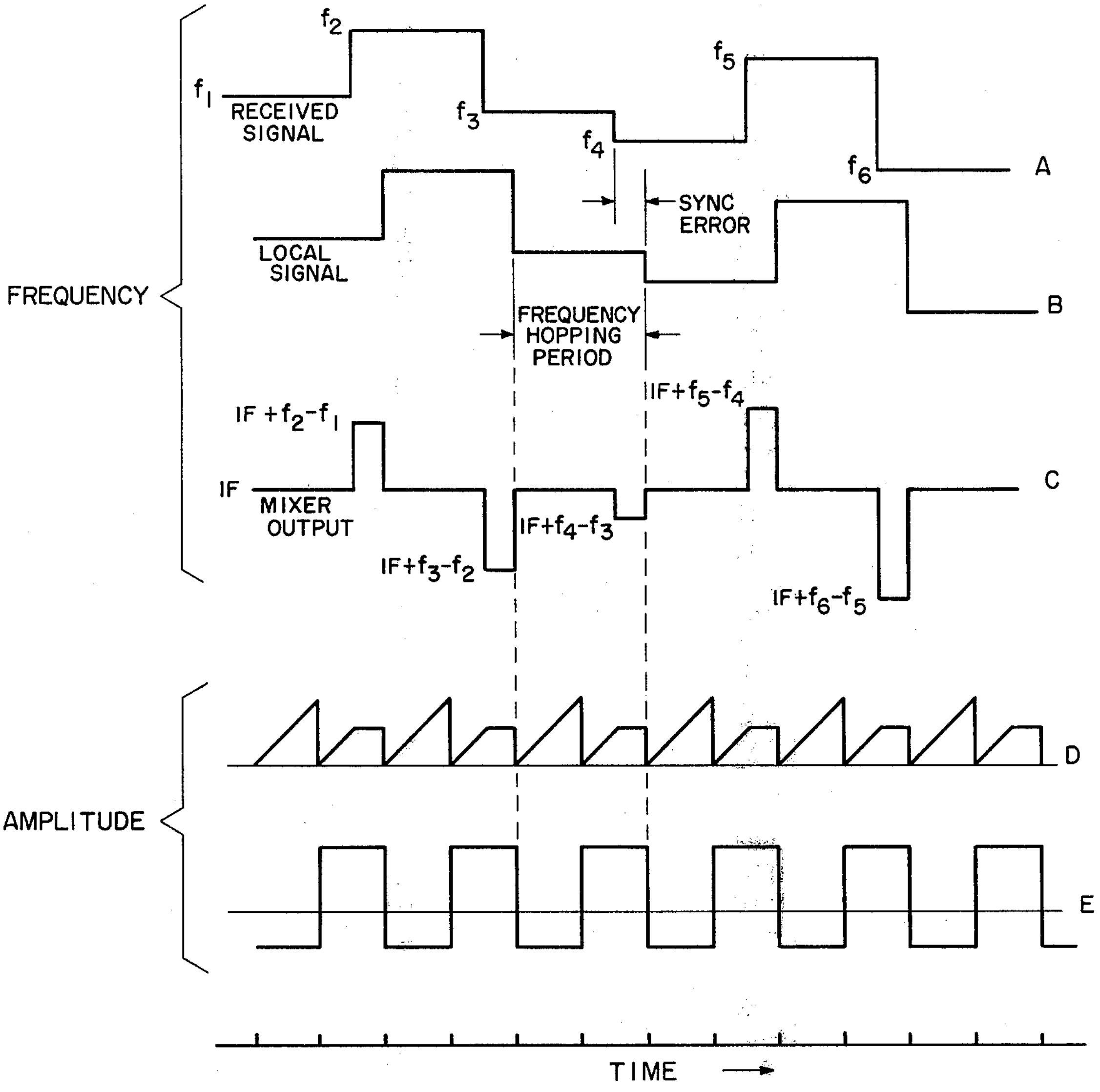
FIG. 3 illustrates graphically the second or coarse sync phase of this invention.

Bandpass filters 36A, 36B, 36C are connected to the outputs of mixers 24A, 24B, 24C; the bandwidths of the filters are approximately equal to the reciprocal of the FFH period. Limiters 38A, 38B are connected to the output of bandpass filter 36A and set a minimum amplitude threshold and a maximum amplitude. Integrate-and-dump filters 40A and 40B are connected to the outputs of limiters 38A, 38B. An integrate-and-dump filter is a well known type of high-Q resonant circuit which can be dumped (quenched) on command. When a sinusoid of frequeny corresponding to the resonant frequency is fed into the resonant circuit, during the time the sinusoid continues oscillations build up linearly in the integrate-and-dump filter; when the sinusoid stops, the oscillations continue at the then existing level. Thus, the integrate-and-dump filter integrates. Dumping occurs at the end of each FFH period in filter 40A and at the middle and end of each FFH period in filter 40B in response to outputs C and C/2 of the electronic clock 14B. The integrate-and-dump filter is the optimum filter for the detection of sinusoids in white Gaussian noise. An acquisition control 42A is connected to the output of the integrate-and-dump filter 40A. The acquisition control carries out the first phase of synchronization. It has an input threshold; if the amplitude of the integrate-and-dump filter 40A exceeds the threshold prior to dumping, a digital quantity is registered in an adder in the acquisition control. The acquisition control cycles after a predetermined number or group of FFH periods. The acquisition control provides either of two outputs when recycled. If the adder in the acquisition control has registered during every FFH period since the previous recycling, there is acquisition and the acquisition control provides an output that cedes control of the clock 14B to the coarse sync control 42B; however, if the adder has not registered during every FFH period since the previous recycling, it provides an output that causes the clock to skip a pulse whereby the digital word sequence of PSG 16B is stepped back one digital word relative to that of PSG 16A. Thus the digital word sequence of PSG 16B is stepped back relative to the digital word sequence of transmitter PSG one FFH period, every preselected number of FFH periods until the local signal is in sync with the received signal to the nearest FFH period. In FIGS. 3A, 3B, the received signal and the local signal are less than one FFH period apart. FIG. 3C shows the intervals when the output of mixer 24A is the correct IF. The foregoing constitutes the first or acquisition phase.

The filter 40B integrates and dumps every half FFH period in response to output C/2 of the receiver clock. Coarse sync control has two circuits that sample the amplitudes of the output of the integrate-and-dump filter 40B during alternate half FFH periods. FIG. 3D shows the output of the integrate-and-dump filter. Alternate samplings are inverted; the samplings are shown in FIG. 3E. The amplitudes differ because the integrate-and-dump filter is sharply tuned to the IF and amplitude does not increase in the integrate-and-dump filter during that part of a pulse period when there is no correct IF, as shown in FIG. 3C. The two circuits of the coarse sync control average the positive and negative amplitudes of FIG. 3E for a predetermined number of FFH periods. Before recycling, the coarse sync control provides an output to advance or retard the phase of the output of the receiver electronic clock 14B by a predetermined minor fraction of an FFH period provided that the difference of the averaged amplitudes of the two circuits exceeds an output threshold. The process repeats until the coarse sync does not provide a difference output which exceeds the threshold level; when coarse sync control provides no output correction voltage, the fine sync control is enabled. When the fine sync phase begins the frequency hopping received signal and local signal are out of phase by a small fraction of an FFH period.

The fine sync circuit arrangement includes two parallel channels; one channel includes mixer 24B, bandpass filter 36B and limiter 38C and is connected to the phase retarded local signal lead 32 and the other channel includes mixer 24C, bandpass filter 36C and limiter 38D and is connected to the phase advanced local signal lead 34. Two identical digitial switches 50A, 50B are connected to the output of PSG 16B. Each switch 50A, 50B has $2^m$ outputs where $m$ is less than or equal to n. For each group of $2^{n-m}$ digital words one only of each of the outputs of each switch 50A, 50B is connected to the input of the respective switch. Two identical sets 52A, 52B of integrators 54 in the form of bandpass filters are connected to the outputs of the switches 50A, 50B. A rectifying diode 56 is connected to the output of each integrator 54. The outputs of sets 52A, 52B are connected in common at 58A and 58B are connected to a difference circuit 60. Fine sync control 42C is connected to the output of the difference circuit 60. The integrators 54 operate in analog fashion; there is no reset. The difference circuit provides a + or − output to the fine sync control. There is a threshold either in the output of the difference circuit or the input of the fine sync control. Every predetermined number of FFH periods, fine sync control 42C samples the output of the difference circuit and advances or retards the clock a minor fraction of the phase advance and retard of the signals on leads 32, 34.

The fine sync control operates continuously to check sync and to make adjustments as needed. The coarse sync control monitors the sync too and resumes control over the clock when there is sufficient phase difference; otherwise control over the clock remains with the fine sync control 42C. The fine sync circuit can be changed to an ultra fine sync circuit having essentially the same components as the fine sync circuit but using a smaller value for m and designed for making finer adjustments in the clock.

This invention can be utilized by setting the transmitter and receiver when they are at the same site. One or both may be on aircraft whereby the distance between transmitter and receiver increases and then varies rapidly. Once set and synchronized, the transmitter sends the carrier continuously, whether modulated or unmodulated, and the synchronizing circuit continuously monitors the received and local signals and adjusts the receiver clock as necessary. Alternatively, the transmitter and receiver may be manned by operators. The time registers of the PSG at transmitter and receiver are set to some prearranged reference time. Also be prearrangement a message is sent at a particular time at which time the operator at the receiver starts the synchronizing circuit. Alternatively, the transmitter operator instructs the receiver operator via a different unrelated communication channel.

What is claimed is:

1. A circuit for synchronizing a frequency hopping receiver with a companion frequency hopping transmitter comprisng:

a pseudo-random sequence generator responsive to an activating pulse for stepping one digital word of a predetermined indexable sequence of $n$-bit digital words, each digital word being from a population of $2^n$ distinct digital words, the pseudo-random sequence generator including time registering means indexable together with the sequence of digital words, and operator settable means for indexing the time registering means and the sequence of digital words, an electronic clock that provides timing pulses for activating the pseudo-random sequence generator at the frequency hopping rate to step the sequence of digital words and the time registering means, a frequeny synthesizer coupled to the electronic clock and to the pseudo-random sequence generator to provide a frequency hopping local signal that is a sequence of frequencies selected from among a population of $2^n$ predetermined frequencies by the digital words, a mixer for the frequency hopping local signal and received signals, and means coupled to the output of said mixer and coupled to said electronic clock and operable to cause the clock to skip one activating pulse every N successive frequency hopping periods, until the frequency hopping local signal and a frequency hopping signal from the companion receiver are out of sync of less than one frequency hopping period.

2. A synchronizing circuit as defined in claim 1 wherein said last-recited means includes a bandpass filter for correct IF coupled to the output of said mixer, and a limiter coupled to the output of said bandpass filter.

3. A synchronizing circuit as defined in claim 2 wherein said last-recited means further includes an integrate-and-dump filter coupled to the output of said limiter and to said clock to integrate the IF input thereto and to dump at the start of each frequency hopping period.

4. A synchronizing circuit as defined in claim 3 wherein said last recited means includes an acquisition control coupled to the integrate-and-dump filter and to the electronic clock for obtaining an output from the integrate-and-dump filter just prior to dumping if the voltage in the integrate-and-dump filter exceeds a predetermined level and operable every group of N frequency hopping periods to cause the electronic clock to skip one activating pulse until there are N outputs from the integrate-and-dump filter in a group of N frequency hopping periods.

5. A synchronizing circuit as defined in claim 4 further comprising:

a second limiter coupled to the output of said bandpass filter, a second integrate-and-dump filter coupled to the output of said second limiter and to said electronic clock to integrate IF input and responsive to pulses from said electronic clock every one-half frequency hopping period to dump, and a coarse sync control coupled to said second integrate-and-dump filter and said electronic clock and responsive to pulses from said electronic clock every one-half frequency hopping period for sampling the output from the second integrate-and-dump filter just prior to each dumping and operable when the frequeny hopping local signal and a frequency hopping received signal are out of phase by less than one frequency hopping period to compare the average length of alternate half periods during which there is correct IF, over a predetermined number of frequency hopping periods and to adjust the phase of activating pulses from the electronic clock, until the frequency hopping local signal and the frequency hopping received signal are out of sync by no more than a predetermined minor fraction of a frequency hopping period.

6. A synchronizing circuit as defined in claim 1 further comprising:

means including a band pass filter for correct IF coupled to the output of said mixer and coupled to the electronic clock and operable when the frequency hopping local signal and a frequency hopping received signal, intended for said receiver, are out of sync by less than one frequency hopping period, to compare the average length of alternate half periods during which there is correct IF over a predetermined number of frequency hopping periods, and to adjust the phase of activating pulses from the electronic clock until the frequency hopping local signal and the frequency hopping received signal are out of sync by no more than a predetermined minor fraction of a frequency hopping period.

7. A synchronizing circuit as defined in claim 6 wherein said frequency synthesizer provides three essentially identical frequency hopping local signals, two of the signals being advanced and retarded in phase equally by a small fraction of a frequency hopping period relative to the frequency hopping local signal coupled to said mixer, a second and third mixer for the advanced and retarded frequency hopping local signals and frequency hopping received signals, and means coupled to the outputs of said second and third mixers and to said electronic clock and responsive to the digital word outputs of said pseudo-random sequence generator for finely adjusting the phase of said electronic clock to approximately equalize the IF outputs from said second and third mixers.

8. A synchronizing circuit as defined in claim 7 wherein said last-mentioned means includes two identical sets of $2^m$ integrators, there being one integrator in each set for each of the $2^{n-m}$ groups of digital words, two identical switch means in circuit with outputs of the second and third mixers and said sets of $2^m$ integrators, said two switch means being responsive to the digital words provided by said pseudo-random sequence generator to transfer IF from the second and third mixers to an integrator of each set in accordance with the digital words provided by said pseudo-random sequence generator, a difference circuit having two inputs and one output, rectifying diodes coupling the outputs of the integrators of the two sets to respective inputs of said difference circuit, and a fine sync control coupled to the output of said difference circuit and to said electronic clock to finely adjust the phase of activating pulses of said clock after said coarse sync control has completed its operation.

9. A synchronizing circuit as defined in claim 8 further comprising a bandpass filter and a limiter in circuit between each of the second and third mixers and the respective switch means, the last-recited bandpass filters being of comparable bandwidth to the first-recited bandpass filter.

10. A synchronizing circuit as defined in claim 5 further comprising demodulator means connected to the output of said second limiter.

* * * * *